United States Patent
Lu et al.

(10) Patent No.: US 7,826,841 B2
(45) Date of Patent: Nov. 2, 2010

(54) OPEN WIRELESS ARCHITECTURE VIRTUALIZATION SYSTEM FOR WIRELESS MOBILE TERMINAL DEVICE

(76) Inventors: Wei Lu, 1218 Bubb Rd., Cupertino, CA (US) 95014; Dexi Lu, 1218 Bubb Rd., Cupertino, CA (US) 95014

( * ) Notice: Subject to any disclaimer, the term of this patent is extended or adjusted under 35 U.S.C. 154(b) by 428 days.

(21) Appl. No.: 12/029,100

(22) Filed: Feb. 11, 2008

(65) Prior Publication Data
US 2008/0146178 A1      Jun. 19, 2008

(51) Int. Cl.
*H04W 4/00*    (2009.01)
*H04M 1/00*    (2006.01)
*H04M 11/00*   (2006.01)

(52) U.S. Cl. ............... 455/434; 455/550.1; 455/403
(58) Field of Classification Search ............ 455/550.1, 455/552.1, 553.1, 556.1, 184, 434, 403
See application file for complete search history.

(56) References Cited

U.S. PATENT DOCUMENTS

| | | | | |
|---|---|---|---|---|
| 7,283,838 B2* | 10/2007 | Lu | ............ | 455/550.1 |
| 7,522,888 B2* | 4/2009 | Lu | ............ | 455/84 |
| 7,630,736 B2* | 12/2009 | Wang | ............ | 455/553.1 |
| 7,784,029 B2* | 8/2010 | Hassan et al. | ............ | 717/120 |
| 2002/0016869 A1* | 2/2002 | Comeau et al. | ............ | 709/324 |
| 2002/0045441 A1* | 4/2002 | Ralston et al. | ............ | 455/418 |
| 2003/0050055 A1* | 3/2003 | Ting et al. | ............ | 455/419 |
| 2005/0076256 A1* | 4/2005 | Fleck et al. | ............ | 713/320 |
| 2006/0010272 A1* | 1/2006 | Solomon et al. | ............ | 710/105 |
| 2007/0105587 A1* | 5/2007 | Lu | ............ | 455/552.1 |
| 2007/0105589 A1* | 5/2007 | Lu | ............ | 455/556.2 |
| 2008/0304404 A1* | 12/2008 | Lu et al. | ............ | 370/210 |
| 2009/0023453 A1* | 1/2009 | Hu et al. | ............ | 455/452.1 |
| 2009/0075654 A1* | 3/2009 | Lu et al. | ............ | 455/435.2 |

* cited by examiner

*Primary Examiner*—Tilahun Gesesse (57) ABSTRACT

A virtualized Open Wireless Architecture (OWA) layer is designed between the physical transmission layer and the user application and operating system (OS) layers to provide a converged open radio transmission platform, and provide a solution to make the application and OS layers to be totally independent to the wireless transmission layer. The OWA virtualization layer defines the portable wireless air-interface modules corresponding to the physical radio transmission technologies (RTTs) to enable the flexible change of different RTTs by an external memory card, and facilitates the visitor OS operable upon the host OS of the mobile terminal device to support seamless handover and switch between different OS platforms.

19 Claims, 5 Drawing Sheets

Open Wireless Architecture (OWA) Virtualization Layer

FIG.1 Conventional Mobile Phone Architecture (Prior Art)

FIG.2 OWA-Based Wireless Mobile Terminal Architecture

FIG. 3 Open Wireless Architecture (OWA) Virtualization Layer

FIG.4 Wireless Adaptation & Virtualization Sub-Layer

FIG.5 OWA BIOS Interface and Framework

FIG.6 Open Interface Parameters (OIP) Structure

OPEN WIRELESS ARCHITECTURE VIRTUALIZATION SYSTEM FOR WIRELESS MOBILE TERMINAL DEVICE

BACKGROUND OF THE INVENTION

1. Field of the Invention

This invention relates to a wireless communication architecture, including a signal processing system that allows virtualization of the Open Wireless Architecture (OWA) Layer between the physical transmission layer and the user application and operating system layers to ensure their complete independence and openness in both architectures and operations.

2. Description of the Related Art

Commercial wireless mobile communications have been developed for almost thirty years, and played a special role in today's information and communication technology industries. Since last year, the global number of mobile phones has exceeded the number of computers, and continues to increase rapidly. Basically, the mobile wireless terminal device has become part of our life, same as the Internet, it will continue to play more important role on the worldwide basis.

However, the conventional mobile terminal device including the mobile phone system has many technical limitations which become the critical issues for the future development. The major problems of the conventional mobile terminal system include:

a) System architecture is very closed. Every mobile phone vendor has its own architecture and all systems modules come from same vendor or its partners only.

b) Every mobile phone is limited to its specific wireless standards or called Radio Transmission Technologies (RTTs), and does not allow flexibility in selecting different RTTs.

c) Some multi-standards mobile phone is just coupling several separate RTTs into the system which consumes much power and system resources, and unused RTTs can not be removed from the system.

d) Every mobile phone is locked to its own operating system (OS), and do not allow any applications if their OS is different from its own OS.

e) The whole system architecture relies directly or indirectly on the physical radio transmission layer.

Because of these architectural problems, the mobile phone becomes one of the least cost-effective consumer products based on the report from 2007 World Wireless Congress. The user can not upgrade or improve the mobile phone due to its closed architecture and lock to specific RTT and OS platform.

The mobile applications are facing tremendous development and movement across the global and will continue to evolve from a traditional voice-centric service to the multimedia services including voice, data, message and video. These multimedia services may run on same OS platform or come from different OS platforms developed by third party vendor or ported from other system platforms such as computer system. Developing all mobile applications upon same single OS platform is very costly and do not make any sense in the commercial business market.

Meanwhile, these multimedia applications require the underlying wireless transmission to be broadband, high-speed and full mobile. However, from the wireless communication's point of view, no single wireless standard (or called radio transmission technology) can provide both broadband high-speed and seamless mobility features based on the communication theory.

Therefore, in order to support the multimedia applications for the mobile phone device, multiple RTTs must work together as a converged radio platform rather than a single RTT system.

Various solutions have been proposed to solve the above problems in the mobile communications. These include Software Defined Radio (SDR), Multi-Radios Platform (MRP), Google Android Platform and Symbian OS, etc. Each of these systems is described briefly below.

Software Defined Radio (SDR)

Software Defined Radio (SDR) is a broadband radio in which the preset operating parameters including inter alia frequency range, modulation type, and/or output power limitations can be reset or altered by software. Basically, SDR is first a broadband transceiver, then is a radio which can operate in set frequency point and set wireless standard by software.

While SDR is a very good military wireless communication solution, it does not make sense in commercial wireless communications because of several critical issues:

a) SDR is a broadband transceiver which is too expensive in commercial and consumer market;

b) SDR consumes too much spectrum in constructing the broadband radio transceiver;

c) SDR does not mean open system architecture which is extensible, removable and upgradeable;

Commercial mobile communications demand cost-effective and spectrum-efficient wireless transmission, and therefore the radio must be narrowband in nature with enough flexibility in changing the RTT in case of need. In this way, the cost of mobile terminal device, the mobile service and the spectrum utilized can be minimized.

Therefore, SDR can not solve any problem as listed above (for commercial communications).

Multi-Radios Platform (MRP)

In order to support multi-radios for commercial mobile communications, many companies developed MRP products including those from Nokia, Samsung, Motorola and Ericsson with chips from Infineon Technologies, Texas Instruments, Samsung Semiconductors, etc. Taking Nokia 6680 mobile phone as an example, these MRP solutions do not solve the problem effectively because:

a) MRP is just coupling several separate Radio transceivers into one RF (radio frequency) body which consumes much power;

b) MRP can not remove unused radio(s) from the system as they come together from the production;

c) MRP is hard to support too many radios (limit to 2-3) due to limitation in power and processing resources;

d) MRP systems are fully relying on the specific RTTs supported;

e) MRP system is not designed on open architecture platform which means all the MRP modules are from same vendor, and not open to users.

Therefore, as the user switches among different multimedia applications in different service areas, this MRP system does not work properly.

Google Android Platform

After WAP (wireless application protocol) Forum, OMA (open mobile alliance) and NGMN (next generation mobile networks), Google launched the OHA (open handset alliance) with focus on its proposed Android platform in constructing the open mobile application platform.

But, the Android Platform is just another new OS (operating system) platform based on Linux Kernel, without providing capability in supporting other OS platforms, or mapping to other OS platforms.

Furthermore, the Android platform is only focusing on the user application layer and high-end of the OS layer, without providing solutions to be independent to the mobile phone system level and transmission level. While Android assumes the underlying layers should be independent to the above layers, the fact is that wireless lower layers are much different from the wireline lower layers because at least, the wireless transmission bandwidth is much limited than that of wireline transmission.

Therefore, Android Platform does not help solve the problems because one single OS (whether comes from Google or Microsoft or others) can not support so many rapidly increasing mobile applications across the global in long term.

Symbian OS

Same as Google Android Platform, and also as Microsoft Mobile OS platform, a single Symbian OS platform, such as Symbian OS v8.0 by Symbian Software Ltd, UK, will not solve the problems for the future mobile communications requiring various multimedia applications across different OS platforms.

General Shortcomings of the Prior Art

All of these known systems fail to meet one or more of the following goals:
a) To provide a converged multiple radio transmissions platform which should be extensible, removable, upgradeable and cost-effective;
b) To provide portability of the operating system across a wide range of wireless system platforms;
c) To provide a solution to make the application and OS layers to be independent to the wireless transmission layer;
d) To maximize performance by using the underlying wireless hardware as much as possible.

This invention provides a system that achieves these goals well.

SUMMARY OF THE INVENTION

An object of the invention is to overcome at least some of the drawbacks relating to the compromise designs of prior art systems as discussed above.

In order to solve the problems existed in the conventional mobile wireless communications, and meet the goals as mentioned above, improvement of the current wireless system architecture is the only and final solution. The Open Wireless Architecture (OWA) approach has been proposed to achieve the above goals and shifted the wireless mobile terminal technology from a transmission-specific radio system to an interface-based open system platform for the complete openness and simplicity of the future mobile terminal device.

This invention virtualizes an OWA System Layer between the physical transmission layer and the high user application and operating system layers to ensure their complete independence and openness in both architectures and operations.

The OWA Virtualization Layer basically performs the following tasks and functions:
a) Mapping the underlying transmission-specific radio interfaces and signals into open interface-based interface parameters and signals, and vice verse,
b) Supporting open baseband processing of different existing and future radio transmission technologies (RTTs) based on open interface parameters (OIP) rather than specific radio transmission method,
c) Defining the portable wireless air-interface modules corresponding to the physical transmission technologies to enable the flexible change of different RTTs by an external memory card or external module,
d) Enabling the Visitor OS (operating system) operable upon the Host OS of the mobile phone to support seamless handover and switch between different OS platforms,
e) Scheduling between Host OS and Visitor OS and providing open OS API (application programming interface) to the user application layer.

By using this OWA Virtualization Layer, the underlying physical transmission level which comprises multiple RTTs, assumes one common OS (operating system) platform above this virtualization layer, and the user level which comprises multiple OSs and application platforms, assume one common RTT below this virtualization layer. In fact, the mobile terminal system is open for multiple RTTs and multiple OSs concurrently. The mobile phone can support any application upon any OS platform, and seamlessly operate in any wireless standard or RTT by inserting the necessary air-interface external memory card.

The OWA Virtualization Layer is basically a pool of baseband processing modules and sub-systems which can be implemented into one single SoC (system-on-chip) silicon chip called OWA Baseband Chip.

The various multiple RTTs comprise the Principal RTT and the Supplemental RTTs, and the Principal RTT is the RTT which the user uses it most frequently and more preferably.

The various multiple OSs comprise the Principal OS and the Supplemental OSs, and the Principal OS is the OS which the user uses it most frequently and more preferably. By optimizing the system for the Principal operation mode, including the Principal OS and the Principal RTT, the wireless mobile terminal system performance can be optimized, and the wireless spectrum utilization efficiency can be maximized. Meanwhile, the terminal system can be operable across different OS and RTT platforms in the Supplemental operation mode, including the Supplemental OSs and the Supplemental RTTs.

Except the RF (radio frequency) front-end system which remains to be the key challenge of the industry, multiple RTTs can be potable through the Software Defined Modules (SDM) in the forms of external memory cards, external module or internal modules. By the way, SDM is different from and nothing to do with SDR (software defined radio).

All the sub-system modules within the OWA Virtualization Layer are controlled through the OWA BIOS (basic input/output system) Interface and Framework, and based on open interface parameters (OIP) rather than RTT-specific transmission methods. Therefore, the virtualization layer is totally open for the baseband processing of any RTT. Different RTTs correspond to different OIPs in the external memory card defined by the SDM, and unused RTTs can be removed from the external memory card easily.

The OWA BIOS Interface and Framework includes the computer BIOS in addition to the wireless BIOS, which enables the full compatibility and convergence with the computer system architecture. This is a very important movement in the wireless architecture because the future mobile phone will be first, a computer, then an open wireless architecture (OWA) terminal system.

Furthermore, this OWA BIOS Interface and Framework provides system flexibility in moving the computer-based modules including hardware and software modules to the OWA wireless mobile terminal device smoothly and effectively.

From all of the above disclosures of the present invention, the OWA Virtualization Layer satisfies the aforementioned goals very well.

The details of the present invention are disclosed in the following drawings, descriptions as well as the claims based on the abovementioned elements.

The various aspects, features and advantages of the disclosure will become more fully apparent to those having ordinary skill in the art upon careful consideration of the following detailed description thereof with the accompanying drawings described below.

BRIEF DESCRIPTION OF THE DRAWINGS

Having thus described the invention in general terms, reference will now be made to the accompanying drawings, which are not necessarily drawn to scale, and wherein:

Like reference numerals refer to like parts throughout the several views of the drawings.

DETAILED DESCRIPTION

The present inventions now will be described more fully hereinafter with reference to the accompanying drawings, in which some examples of the embodiments of the inventions are shown. Indeed, these inventions may be embodied in many different forms and should not be construed as limited to the embodiments set forth herein; rather, these embodiments are provided by way of example so that this disclosure will satisfy applicable legal requirements. Like numbers refer to like elements throughout.

The invention is described below in sections for the sake of clarity. First, the conventional architecture is described in order to make it easier to see the unique features of the invention by way of comparison. Then, the detailed system architecture according to the invention is described as a whole. Finally, the main novel features of the invention are described individually.

Conventional Wireless Mobile Phone architecture

Figure 1:
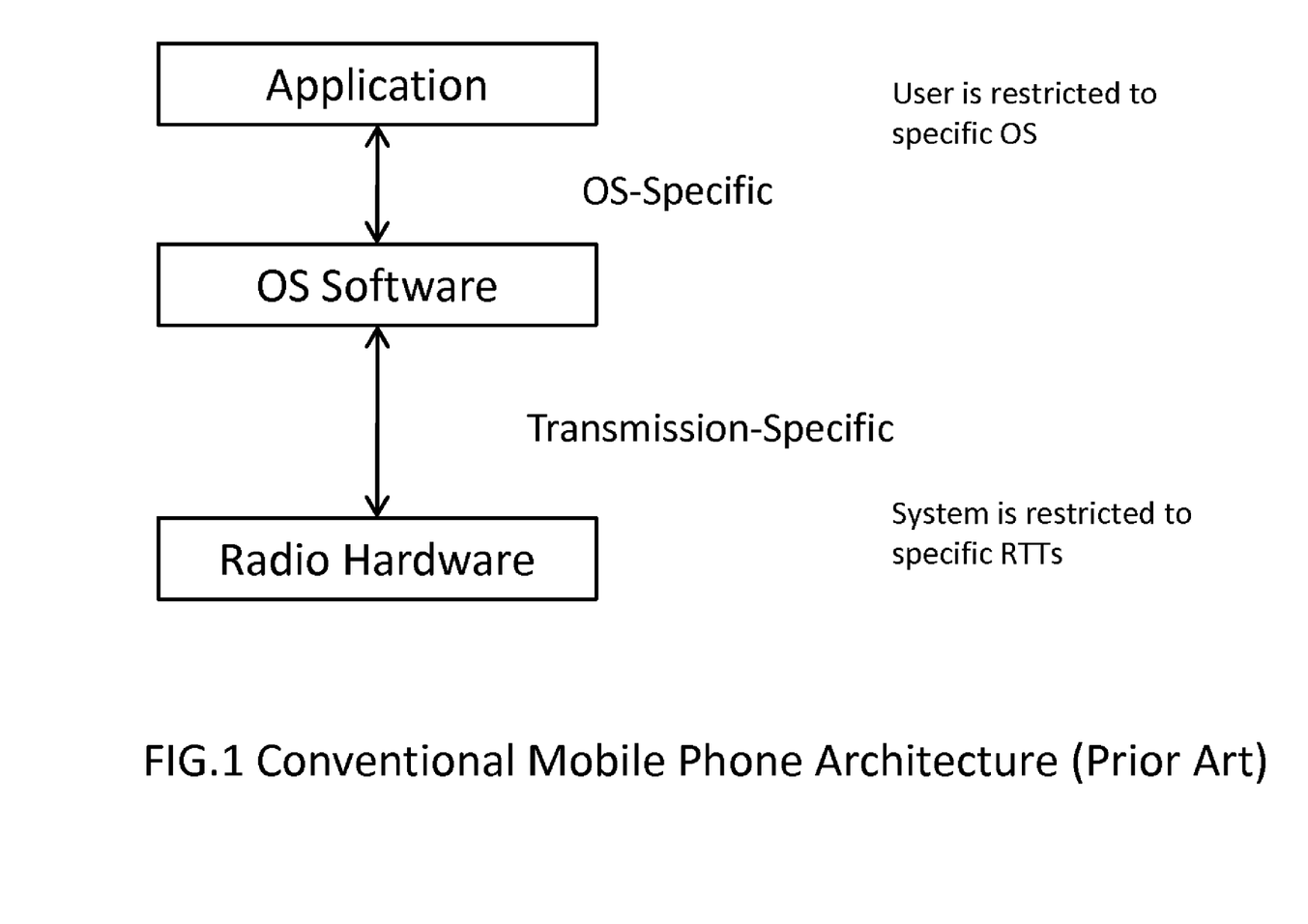
FIG. 1 is a block diagram that illustrates the architecture of a conventional mobile phone system based on specific radio transmission technology and specific operating system.

FIG. 1 illustrates the conventional mobile phone architecture that incorporates a transmission-specific radio hardware and a specific operating system (OS) oriented application platform.

Such transmission-specific radio transmission technologies (RTTs) include GSM (global system for mobile communications), CDMA (code division multiplex access), OFDMA (orthogonal frequency division multiplex access), WLAN (wireless local area network) and BWA (broadband wireless access), etc. Traditionally, each mobile phone system is designed for specific RTT or called "Wireless Standard", for example, the GSM phone or the CDMA phone. There are some multi-modes' mobile phone available in the commercial market, such as the Nokia 6680 phone supporting GSM, CDMA and Bluetooth, but they are limited to and fixed to these RTTs only by design, and both the user and the system can not change to other RTTs. Furthermore, these specific RTTs modules (hardware and software modules) can not be removed if the users do not use certain RTT which consumes tremendous system resource and wireless transmission resource.

The conventional mobile OS (operating system) is specially designed for the specific RTT(s), such as the Symbian OS v8.0 by Symbian Software Ltd, UK, supporting GSM and Bluetooth. Once the original OS is implemented, the user can not change to other OS, and the whole phone system is actually locked to this specific OS only.

Because the mobile phone is locked to this specific OS platform only, all the user application software must follow the definitions and requirements of this specific OS platform.

Therefore, from the underlying radio hardware to the application layer, the whole phone system is very closed in architecture which results in very low efficiency in system performance and transmission performance.

The future mobile communications will be evolving from the traditional voice-centric service to the multimedia services including voice, message, data and video. A single RTT (wireless standard) can not provide both the broadband high-speed transmission (for video and data) and the seamless mobility of the mobile terminal, hence a convergence and integration strategy of multiple RTTs in one common mobile phone device becomes the final solution in developing the next generation wireless mobile terminal device.

Meanwhile, more and more mobile applications are being developed for the new generation mobile Smartphone devices, such as mobile TV, video streaming, MMS (multimedia messaging service), etc. However, most of these new applications come from the computer architecture platform or modified from the existing computer applications to save cost in software development and R&D, etc. The OS platforms in computer system are different from the mobile system, and lots of different OSs exist across the platforms of both computer system and mobile terminal system.

To modify all the computer system applications or other mobile system applications with different OS platforms is very expensive and does not make sense in the commercial business practice. Therefore, seeking an open OS based portable application platform become very important for the mobile terminal device.

In addition, the future mobile phone will be first a computer, than an open system architecture wireless terminal device. Hence, how to converge the wireless architecture with the computer architecture becomes necessary and very important in the future mobile terminal design.

System Architecture According to the Invention

As discussed before, many new mobile applications may come from different OS platforms, such as Microsoft Windows®, Linux, Symbian®, etc. Running different applications with different OS platforms upon the same hardware platform is a challenge for the mobile terminal system design.

Meanwhile, in order to support both the broadband high-speed wireless transmission and the seamless mobility of the mobile terminal device for the fully multimedia mobile services, multiple radio transmission technologies (RTTs) need to be converged and integrated into the same common system platform of the mobile terminal device.

The conventional approach of multi-modes mobile phone architecture, such as Nokia 6680 phone, is coupling multiple wireless systems together, including baseband and radio transceiver subsystems, with one unified OS above the hardware platform. Such conventional solution has the following major problems:

1. The RTT coupling is very closed in architecture and very low efficiency in system performance and radio transmission performance,
2. The coupled RTTs are non changeable, removable and upgradeable in case of changes of services, areas and user demands,
3. The applications are fully dependent on the underlying radio hardware,
4. The unchangeable OS platform limits new applications to be developed and operated, and
5. The whole terminal system (from low layer to high layer) is transmission-specific, and hard to converge with other systems (including computer architecture system).

Figure 2:
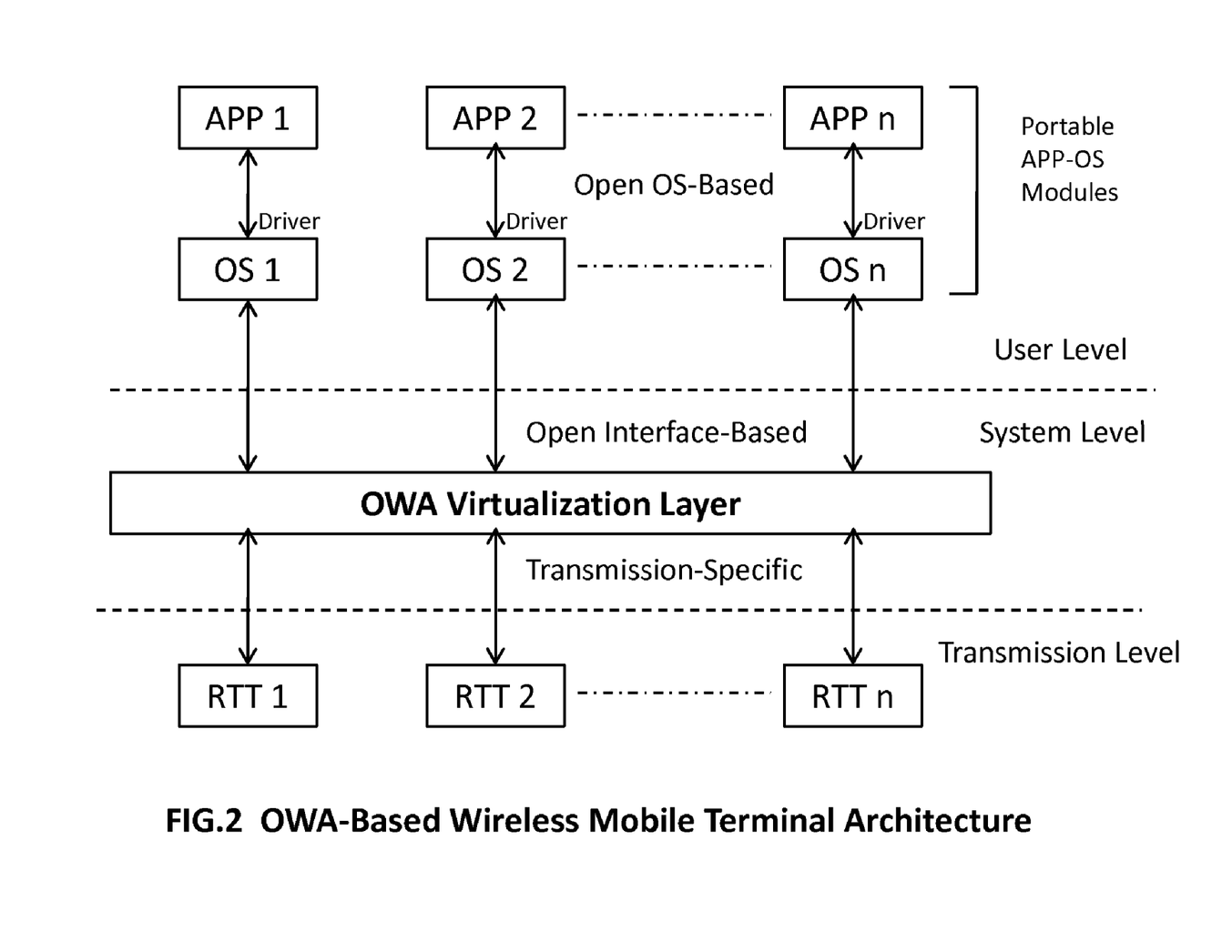
FIG. 2 shows the architecture of the disclosed wireless mobile terminal platform based on Open Wireless Architecture (OWA) that incorporates an OWA Virtualization Layer.

To solve the above problems for the next generation wireless mobile terminal development, FIG. 2 shows a new architecture based on Open Wireless Architecture (OWA) technology platform of the invention.

In FIG. 2, the OWA Virtualization Layer is an innovative invention that incorporates the following functions:

1. Separate the RTT layer with the OS layer, and make them fully independent,
2. Provide the bidirectional virtualized common platforms for both RTT and OS layers,
3. Map the transmission-specific RTTs to the open interface-based parameters, and vice verse,
4. Map the different Visitor OSs (operating systems) to the host OS in supporting different OS platforms, and vice verse,
5. Support portable Air-Interface Modules mapped from/to different RTTs,
6. Support portable Application-OS Modules from other wireless and/or computer platforms.

By utilizing the aforementioned OWA Virtualization Layer, the OS layer and Application (APP) layer are totally independent to the underlying RTT transmission layer and help the user to develop new mobile applications easily, economically and quickly. In addition, because the high layers (above the aforementioned OWA Virtualization Layer, or called User Level) are based on open interfaces (rather than transmission-specific), the users can move different applications across different OS platforms, and support the applications with foreign OS (or called Visitor OS) requirements.

Host OS (or called Principal OS or Default OS) means the Operating System that the user uses it most frequently or most preferably. The Host OS can be reconfigured with any available OS anytime by the user. By utilizing the Host OS as user's principal OS, the system performance can be optimized.

The OWA Virtualization Layer, as set forth above, can be implemented in one single SoC (system-on-chip) silicon which will be discussed in FIG. 3.

The OWA Virtualization Layer, as set forth above, covers the multiple system processing functions from the user-oriented high layers to the physical transmission layer.

The OWA-based wireless mobile terminal, as illustrated in this FIG. 2, is operationally divided into a transmission level, a system level and a user level wherein the operating system (OS) is at the user level, and the aforementioned OWA Virtualization Layer s at the system level.

The OWA Virtualization Layer, as set forth above, comprises all the system level functions including OWA Baseband processing, Wireless adaptation and virtualization, OWA BIOS (basic input/output system) Interface and Framework, Software Defined Modules, Host and Visitor OS interfaces, and Open OS BIOS (basic input/output system) which will be implemented in one single SoC (system on chip) silicon chip called OWA Baseband Chip.

Key Features of the Invention

Figure 3:
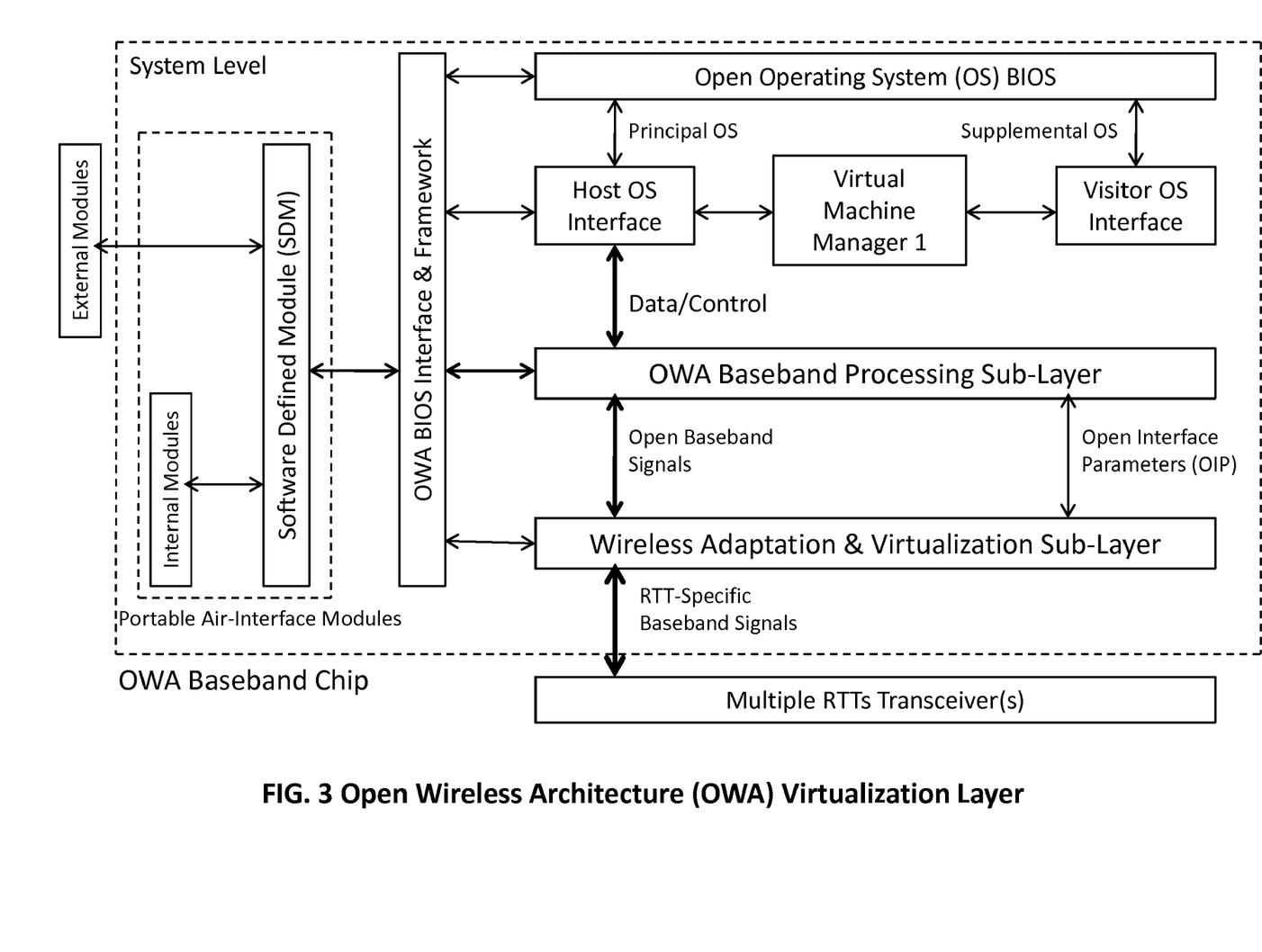
FIG. 3 illustrates the detailed OWA Virtualization Layer used for mapping between the transmission-specific radio transceivers and the interface-based open architecture platform, and processing all OWA system baseband functional modules. These system-level baseband functions will be implemented in one SoC (system-on-chip) silicon chip called OWA Baseband Chip.

The Open Wireless Architecture (OWA) Virtualization System for Wireless Mobile Terminal Device of the present invention comprises the following functional modules and sub-layers as shown in FIG. 3:

a) OWA Baseband Processing Sub-Layer: incorporating open baseband processing of different existing and future radio transmission technologies (RTTs) with Open Interface Parameters (OIP) and baseband management systems, b) Wireless Adaptation and Virtualization Sub-Layer: mapping the aforementioned RTT-specific baseband signals into the open baseband signals and the aforementioned OIP in the aforementioned OWA Baseband Processing Sub-Layer, and vice verse, and adapting each other on data-rate, bandwidth and timing, etc, c) OWA BIOS (basic input/output system) Interface and Framework: managing the system I/O (input/output) architecture, system interface definitions and controls, and system initialization of the open wireless architecture (OWA) system platform, d) Software Defined Module (SDM): defining the portable Air-Interface Modules based on OWA system platform which allows the flexible change of aforementioned RTTs or wireless standards by an external memory card or SIM (standards identity module) card, e) Host OS Interface: interface to the principal and the home operating system of the wireless mobile terminal device where the user can reconfigure this Home OS with different OS, f) Visitor OS Interface: interface to the supplemental, foreign or visitor operating system (which is different from the aforementioned Host OS) upon which a new application or supplemental application is running, g) Virtual Machine Manager 1: managing the mapping and monitoring of virtual machine system between the Visitor OS and the Host OS in order to support seamless handover and switch between different operating systems, and h) Open OS BIOS (basic input/output system): multiplexing and scheduling the aforementioned principal OS and supplemental OS, and providing open OS API (application programming interface) to the above application layer.

The Wireless Adaptation and Virtualization Sub-Layer, as set forth above, is utilized to transfer the transmission-specific baseband signals, outputted from the various RTT transceivers, into the open baseband signals and the corresponding air interfaces in the form of aforementioned open interface parameters (OIP), and vice verse.

The OWA Baseband Processing Sub-Layer, as set forth above, is utilized to de-channelize, demodulate and decode the underlying aforementioned open baseband signals and the aforementioned OIP into the Data traffic and the Control traffic to the Host OS Interface, as set forth above, and vice verse.

The Adaptation and Virtualization Sub-Layer, OWA Baseband Processing Sub-Layer, Host OS Interface and Open OS BIOS, as set forth above, are controlled by the aforementioned OWA BIOS Interface & Framework. Therefore, this OWA BIOS Interface & Framework, as set forth above, is the most important system I/O (input/output) interface for the open wireless architecture (OWA) system platform. Furthermore, this aforementioned OWA BIOS Interface & Framework is basically the system-level control bus of the OWA wireless mobile terminal device.

The Software Defined Modules (SDM), as set forth above, is utilized to store the aforementioned OIPs and other important system information of the OWA Virtualization Layer to support the portable Air-Interface Modules as well as the open modules for baseband processing, etc.

The Software Defined Modules (SDM), as set forth above, can be stored in or loaded from some internal memory modules, external memory modules or networks through Internet.

The aforementioned OWA Baseband Processing Sub-Layer is one of the most important sub-systems of the OWA wireless mobile terminal device of the present invention and has been patented in USPTO with U.S. Pat. No. 7,283,838.

All the system-level baseband functions including aforementioned OWA Baseband Processing Sub-Layer, Wireless Adaptation and Virtualization Sub-Layer, Host OS Interface, Visitor OS Interface, Open OS BIOS, OWA BIOS Interface & Framework and Software Defined Modules will be implemented in one single SoC (system on chip) silicon chip called OWA Baseband Chip.

The aforementioned OWA Baseband Chip is being developed for the next generation wireless and mobile Smartphone system platforms including iPhone, Google Phone, iPAQ, iHand and other smart phones.

Figure 4:
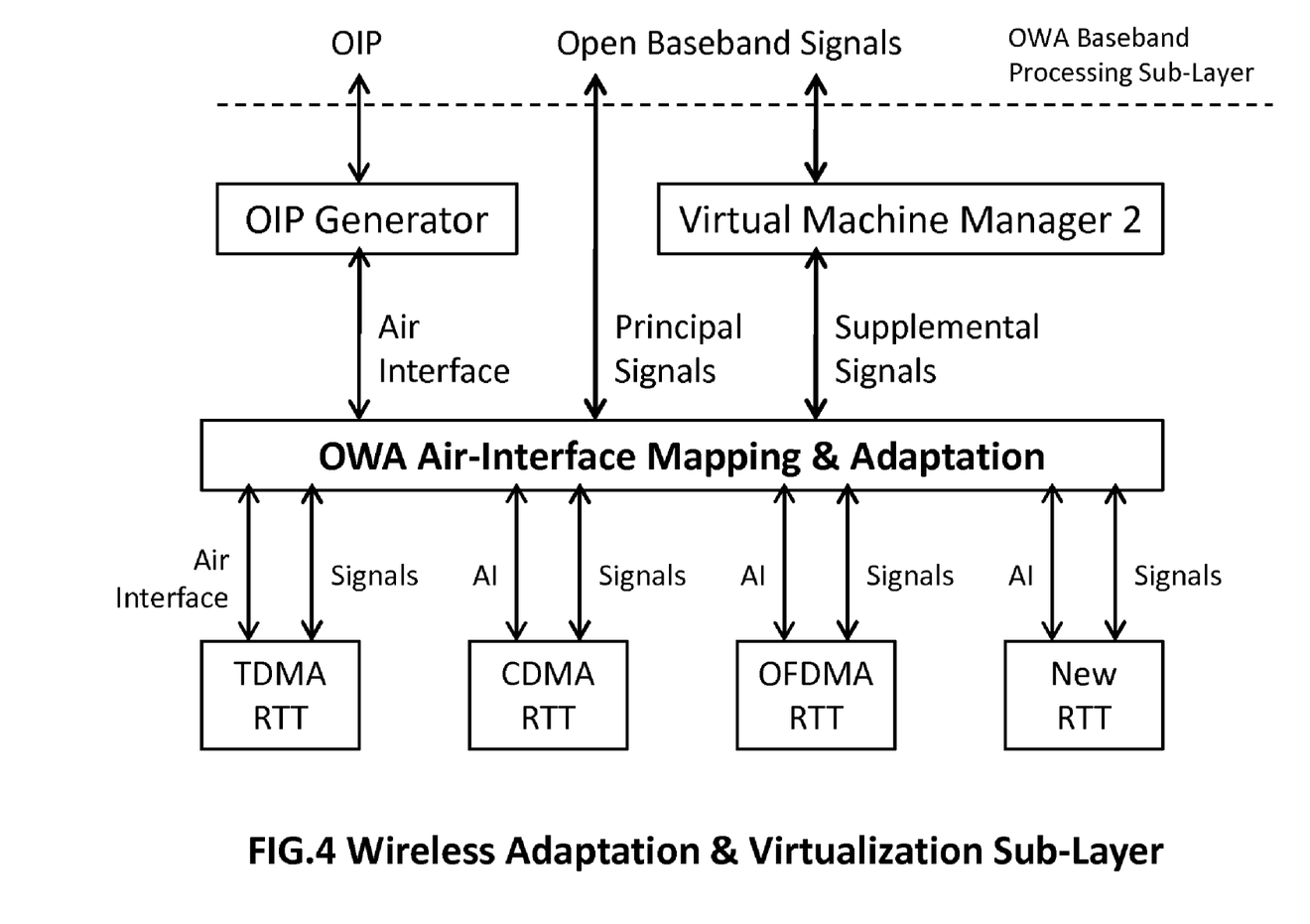
FIG. 4 further illustrates the Wireless Adaptation and Virtualization Sub-layer disclosed in the invention that is utilized to map the different radio transmission technologies (RTTs) into open interface parameters (OIP) defined by the OWA platform, and vice verse.

FIG. 4 shows the detailed Wireless Adaptation and Virtualization Sub-Layer which comprises the following system functions:

a) OWA Air-Interface Mapping and Adaptation: mapping the underlying physical-layer radio transmission technologies (RTTs) into the OWA-based baseband signals and air interfaces, and vice verse, and adapting each other on interface/signal architecture, buffering, multiplexing and scheduling, b) Open Interface Parameters (OIP) Generator: converting air-interface parameters into OWA OIP format, and vice verse, c) Virtual Machine Manager 2: mapping the supplemental baseband signals into the open baseband signals optimized for the principal signals, and vice verse, and handling the pre-processing and post-processing of supplemental baseband signals to/from the OWA Baseband Processing Sub-Layer.

While the OWA wireless mobile terminal system is capable of operating in any RTT, or air interface or wireless standard, the default RTT is called the Principal RTT. This Principal RTT is the one that mobile user uses it most frequently or most preferably. The user can reconfigure this Principal RTT with any RTT available in the user's service area.

By utilizing the aforementioned Principal RTT as the default RTT for the user, the system performance and the transmission performance can be optimized, and the spectrum utilization efficiency can be maximized.

All available RTTs other than the Principal RTT are called the Supplemental RTTs. User can change any Supplemental RTT to be the Principal RTT by reconfiguring the RTT setup in the mobile terminal device.

The baseband signals corresponding to the Principal RTT and the Supplemental RTT, as set forth above, are called the Principal Signals and the Supplemental Signals.

The aforementioned Principal Signals from the Principal RTT bypass the aforementioned Virtual Machine Manager 2, and directly connect to the OWA Baseband Processing Sub-Layer, as set forth above, to optimize the system processing performance.

The aforementioned RTT can be existing RTT or future RTT including TDMA (time division multiplex access), CDMA (code division multiplex access), OFDMA (orthogonal frequency division multiplex access), PDMA (packet division multiplex access) and new defined wireless standards.

Figure 5:
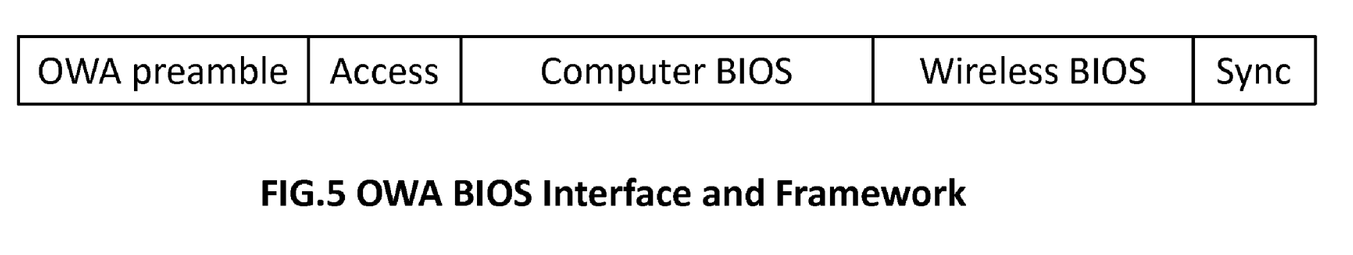
FIG. 5 is a structure of the OWA BIOS (basic input/output system) Interface and Framework used for defining and managing the I/O (input/output) architecture, interface definition and system initialization of the disclosed OWA wireless mobile terminal device.

FIG. 5 shows the structure of the OWA BIOS Interface and Framework, as set forth above, which comprises:

a) OWA Preamble: the beginning part of the OWA BIOS Interface and Framework including header, identity and security encryption words, b) Access: managing the access control to the OWA BIOS Interface and Framework, and assigning the access address to the system modules controlled by the OWA BIOS Interface and Framework, c) Computer BIOS: standard BIOS (basic input/output system) defined in the PC (personal computer) system including the laptop notebook system, d) Wireless BIOS: defining the address, handler and pointer for the OWA functional modules and OWA data structures including the aforementioned Open Interface Parameters (OIP) and the various OWA baseband modules in the system level, e) Sync: the synchronization part of the OWA BIOS Interface and Framework which is managed by the main system clock and timing module and further controls the timing of the corresponding OWA baseband modules and sub-systems in the OWA Virtualization Layer, as set forth above.

The aforementioned Computer BIOS ensures the full compatibility and convergence with the computer system architecture, and provides system flexibility in moving the computer-based modules (both hardware and software) to the OWA wireless mobile terminal system, and vice verse.

The integration of the Computer BIOS and the Wireless BIOS, as set forth above, is an innovative approach for the future wireless and mobile communication architecture because the future mobile terminal device will be first a computer, than an OWA wireless terminal.

The OWA BIOS Interface and Framework, as set forth above, is a System Interface for all system modules, sub-system modules and sub-layers modules, and therefore is very important in terms of system control and system performance.

The OWA BIOS Interface and Framework, as set forth above, is also a system-level control bus to coordinate the processing tasks in the OWA Virtualization Layer, as set forth above.

Figure 6:
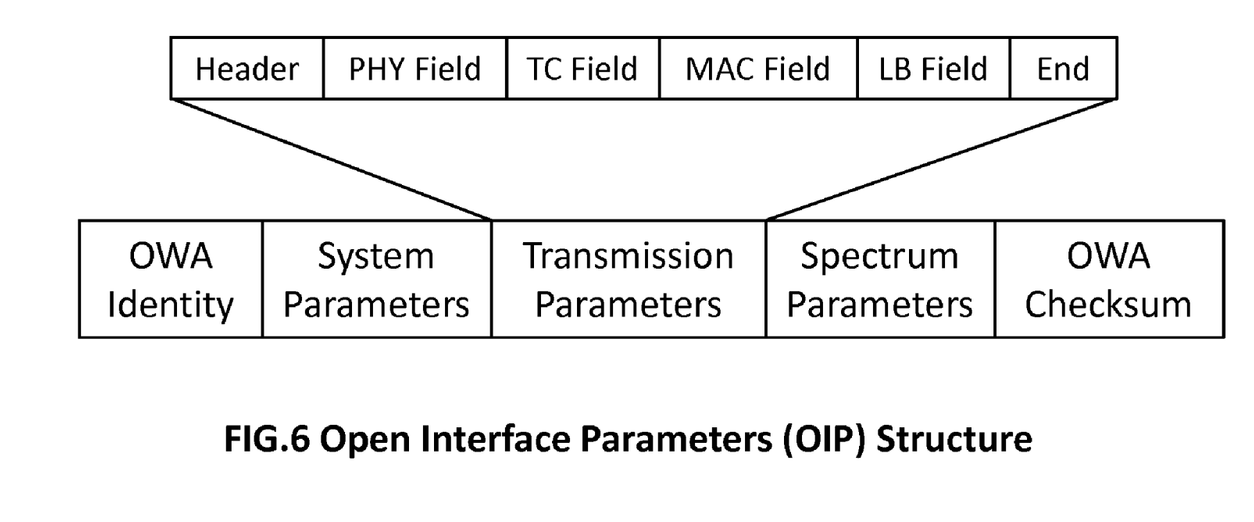
FIG. 6 is a structure of the OIP (open interface parameters) definition containing the mapped various radio transmission technologies (RTTs, or called Wireless Standards).

FIG. 6 illustrates the Open Interface Parameters (OIP) structure which comprises:

a) OWA Identity: the global ID (identity) of the current OIP data structure, b) System Parameters: including processing parameters, network parameters, radio parameters, power parameters, antenna parameters, bandwidth, capacity, performance and quality-of-service which are important upon porting to other mobile phone platforms, c) Transmission Parameters: containing current transmission-based lower-layer parameters including Physical (PHY) field, Transmission Convergence (TC) field, Medium Access Control (MAC) field and Link Budget (LB) field for network/transmission optimization, d) Spectrum Parameters: including current spectrum identification, spectrum location, spectral condition, spectrum index and spectrum priority for open spectrum management and spectrum sharing technique, e) OWA Checksum: including OIP field for error correction coding & decoding, and information encryption check, etc.

The aforementioned Transmission Convergence (TC) field is utilized for the converged networks access, vertical handover between different RTTs (air interfaces) and the adaptive modulation &coding for multiple RTTs.

The aforementioned Link Budget (LB) field is utilized for the network deployment and network/transmission optimization of the converged multiple RTTs' environment.

The aforementioned OIP data structure can be sorted by its OWA Identity which relates to the channel number of the underlying corresponding RTT Air Interface. The OIP array contains the complete RTT Air Interfaces (wireless standards) which the user has registered with the service providers.

The aforementioned OIP can be stored in or loaded from an internal memory modules or an external memory modules defined by the Software Defined Module (SDM), as set forth above, in order to facilitate the Potable Air-Interface Modules for the OWA wireless mobile terminal device. In this way, the user can change the wireless standards (or called RTT Air-Interfaces) by simply changing the external memory card, without need to change the whole mobile phone. If the user does not need any wireless standard, he/she can simply remove the external memory card or change the external memory card. In the event that the user needs multiple wireless standards (RTTs) for the same mobile phone, he/she can load the OIP Array (block of OIP data structures) into the external memory card.

By utilizing the disclosed technologies of the present invention, the OWA wireless mobile terminal architecture becomes complete open in radio transmission technologies, baseband processing and the operating systems. Except the radio frequency front-end header (RF Header) which remains to be the biggest technical challenge and not covered in this invention, the OWA wireless mobile terminal system of the present invention becomes very simple in system implementation because all the OWA baseband functions including the aforementioned Wireless Adaptation & Virtualization Sub-Layer, OWA Baseband Processing Sub-Layer, OWA BIOS Interface & Framework, Software Defined Module and Host/Visitor OS Interfaces can be implemented in one single SoC (system-on-chip) OWA Baseband Chip, as set forth above, and the aforementioned Portable Air-Interface Modules can be stored in or loaded from the External Memory Card, as set forth above. Furthermore, various mobile applications from different OS platforms can be operable and running in this OWA wireless mobile terminal system of the present invention.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. An Open Wireless Architecture (OWA) Virtualization System for Wireless Mobile Terminal Device, said system comprising:

a) OWA Baseband Processing Sub-Layer supporting open baseband processing of different existing and future Radio Transmission Technologies (RTTs) based on Open Interface Parameters (OIP) and baseband management systems, b) Wireless Adaptation and Virtualization Sub-Layer mapping said RTTs—specific baseband signals from both Principal RTT and Supplemental RTTs into Open Baseband Signals and said OIP for said OWA Baseband Processing Sub-Layer, and vice verse, and adapting each other on data-rate, bandwidth, timing and control, c) OWA BIOS (basic input/output system) Interface and Framework managing system I/O (input/output) architecture, system interface definitions and controls, and system initialization of OWA wireless mobile terminal system platform, d) Software Defined Module (SDM) defining Portable Air-Interface Modules based on OWA wireless mobile terminal system platform which allows flexible change of said RTTs or wireless standards by an external memory card or external standards module, e) Host OS (Operating System) Interface connecting Home and Principal operating system (OS) of said wireless mobile terminal device wherein the user can reconfigure said Principal OS with different OS, f) Visitor OS (Operating System) Interface connecting Supplemental, Foreign or Visitor operating system (OS) upon which a new application or visiting application is running, g) Virtual Machine Manager 1 managing the mapping and monitoring of virtual machine system between said Visitor OS and said Host OS in order to support seamless handover and switch between different operating systems, and h) Open OS BIOS (basic input/output system) multiplexing and scheduling said Principal OS and said Supplemental OS, and providing open OS API (application programming interface) for user's application layer.

2. A system as recited in claim 1 wherein said Wireless Adaptation and Virtualization Sub-Layer is utilized to transfer transmission-specific baseband signals outputted from said various RTTs transceivers into said Open Baseband Signals and said OIP, and vice verse.

3. A system as recited in claim 1 wherein said OWA Baseband Processing Sub-Layer is utilized to de-channelize, demodulate and decode said Open Baseband Signals and said OIP into Data information and Control information to said Host OS Interface, and vice verse.

4. A system as recited in claim 1 wherein said Software Defined Module (SDM) is utilized to store said OIPs and important system information of said OWA Virtualization System to facilitate said Portable Air-Interface Modules corresponding to said RTTs as well as open modules for baseband processing.

5. A system as recited in claim 1 wherein said Software Defined Module (SDM) can be stored in or loaded from internal memory modules, external memory modules or networks through Internet.

6. Systems as recited in claim 1 wherein said Wireless Adaptation and Virtualization Sub-Layer, said OWA Baseband Processing Sub-Layer, said Host OS Interface and said Open OS BIOS are controlled through said OWA BIOS Interface and Framework which is the important system I/O (input/output) interface and system-level control bus to coordinate processing tasks in said OWA Virtualization System.

7. A system as recited in claim 1 wherein said Host OS is the operating system that the user uses it most frequently or most preferably, and said Host OS can be reconfigured with any available operating system anytime by the user.

8. A system as recited in claim 1 wherein said OWA BIOS Interface and Framework further comprising:
   a) OWA Preamble including header, identity and security encryption words of said OWA BIOS Interface and Framework,
   b) Access field managing access control to said OWA BIOS Interface and Framework, and assigning access addresses to system modules controlled by said OWA BIOS Interface and Framework,
   c) Computer BIOS (basic input/output system) defined in the PC (personal computer) systems including the laptop notebook system,
   d) Wireless BIOS (basic input/output system) defining address, handler and pointer for OWA functional modules and OWA data structures including said Open Interface Parameters (OIP) and various OWA baseband modules in said OWA wireless mobile terminal device, and
   e) Sync (synchronization) field utilized as synchronization part of said OWA BIOS Interface and Framework which is managed by the main system clock and timing module and further controls the timing of the corresponding OWA baseband modules and sub-systems in said OWA Virtualization System.

9. A system as recited in claim 8 wherein said Computer BIOS ensures full compatibility and convergence with the computer system architecture, and provides system flexibility in moving the computer-based modules including hardware and software modules to said OWA wireless mobile terminal device, and vice verse.

10. A system as recited in claim 1 wherein said Open Interface Parameters (OIP) further comprising:
   a) OWA Identity including global ID (identity) of current said OIP Data Structure,
   b) System Parameters including processing parameters, network parameters, radio parameters, power parameters, antenna parameters, bandwidth, capacity, performance and quality-of-service which are required upon porting to other wireless mobile terminal platforms,
   c) Transmission Parameters containing current transmission-specific lower-layer parameters including Physical (PHY) field, Transmission Convergence (TC) field, Medium Access Control (MAC) field and Link Budget (LB) field for network and transmission optimization,
   d) Spectrum Parameters including current spectrum identification, spectrum location, spectral condition, spectrum index and spectrum priority for open spectrum management and spectrum sharing techniques, and
   e) OWA Checksum including an OIP-field for error correction coding & decoding, and information encryption check.

11. A system as recited in claim 10 wherein said Transmission Convergence (TC) field is utilized for the converged networks access, vertical handover between different said RTTs and the adaptive modulation and coding for multiple said RTTs.

12. A system as recited in claim 10 wherein said Link Budget (LB) field is utilized for network deployment, network optimization and transmission optimization of converged multiple said RTTs' environment.

13. A system as recited in claim 1 wherein said wireless mobile terminal device further comprising:
   a) OWA Virtualization Layer incorporating system-level implementation of said wireless mobile terminal device,
   b) Open and Portable Application and Operating System (OS) Layers incorporating user-level implementation of said wireless mobile terminal device, and
   c) Open and Multiple Radio Transmission Technologies (RTTs) Layer incorporating transmission-level implementation of said wireless mobile terminal device.

14. A system as recited in claim 1 wherein said OWA Virtualization System allows virtualization of OWA Layer between RTTs (Radio Transmission Technologies) Layer and Application and OS (Operating System) Layers to ensure their complete independence and openness in both architectures and operations, and enable the user to develop new mobile applications across different said RTTs and move different applications across different OS platforms as well as enable Visitor OS operable upon Host OS of said wireless mobile terminal device to support seamless handover and switch between different OS platforms.

15. Systems as recited in claim 1 wherein said Principal OS and said Principal RTT incorporate the principal operation mode of said wireless mobile terminal device to maximize the system performance, and said wireless mobile terminal device can be operable across different OS and RTT platforms in the supplemental operation mode with said Supplemental OSs and/or said Supplemental RTTs.

16. An Open Wireless Architecture (OWA) Wireless Adaptation and Virtualization Sub-System for Wireless Mobile Terminal Device, said system comprising:
   a) OWA Air-Interface Mapping and Adaptation module mapping physical-layer specific Radio Transmission Technologies (RTTs) into OWA-based baseband signals and air interfaces, and vice verse, and adapting each other on interface and signal structure, buffering, multiplexing and scheduling,
   b) Open Interface Parameters (OIP) Generator converting air-interface parameters into OWA OIP format, and vice verse, and
   c) Virtual Machine Manager 2 mapping Supplemental Signals into Open Baseband Signals optimized for Principal Signals, and vice verse, and handling pre-processing and post-processing of said Supplemental Signals to/from OWA Baseband Processing Sub-Layer.

17. A system as recited in claim 16 wherein said Principal Signals correspond to Principal RTT (Principal Radio Transmission Technology) which is the default RTT that mobile user uses it most frequently or most preferably, and user can reconfigure said Principal RTT with any RTT available in the user's service area.

18. A system as recited in claim 16 wherein said Supplemental Signals correspond to Supplemental RTTs (Supplemental Radio Transmission Technologies) which are available RTTs other than said Principal RTT, and user can change any said Supplemental RTT to be said Principal RTT by reconfiguring RTT Set-ups in said OWA wireless mobile terminal device.

19. A system as recited in claim 16 wherein said Principal Signals bypass said Virtual Machine Manager 2 and directly connect to said OWA Baseband Processing Sub-Layer to optimize the system processing performance.

* * * * *